United States Patent [19]

Baynes et al.

[11] 4,046,427

[45] Sept. 6, 1977

[54] MECHANICAL WHEEL LOCK CONTROL

[75] Inventors: Gene P. Baynes, Kettering; Frank W. Brooks, Dayton, both of Ohio

[73] Assignee: General Motors Corporation, Detroit, Mich.

[21] Appl. No.: 697,870

[22] Filed: June 21, 1976

[51] Int. Cl.² ............................................. B60T 8/093
[52] U.S. Cl. ................................ 303/115; 188/181 A; 303/116
[58] Field of Search ............... 188/181 A; 303/61, 94, 303/99, 115, 116

[56] References Cited

U.S. PATENT DOCUMENTS

| | | | |
|---|---|---|---|
| 3,276,822 | 10/1966 | Lister et al. | 303/116 X |
| 3,600,043 | 8/1971 | Kosselmann | 303/116 |
| 3,724,914 | 4/1973 | Skoyles | 303/116 |

FOREIGN PATENT DOCUMENTS 778,765  7/1957  United Kingdom ............ 188/181 A

Primary Examiner—George E. A. Halvosa
Attorney, Agent, or Firm—D. D. McGraw

[57] ABSTRACT

A flywheel driven by the differential ring gear of a vehicle senses rear wheel velocity and deceleration rates. A modulating unit includes an accumulator and a pump driven by the same shaft that drives the flywheel from the ring gear. A brake fluid accumulator stores brake fluid during each brake release cycle. The pump pumps fluid from the accumulator into the rear brakes to restore the original brake actuating pressure during each reapply cycle. Pressure from the master cylinder is blocked by movement and position of the accumulator piston during the release and reapply cycles. Orifices control the rate of pressure release and apply.

1 Claim, 1 Drawing Figure

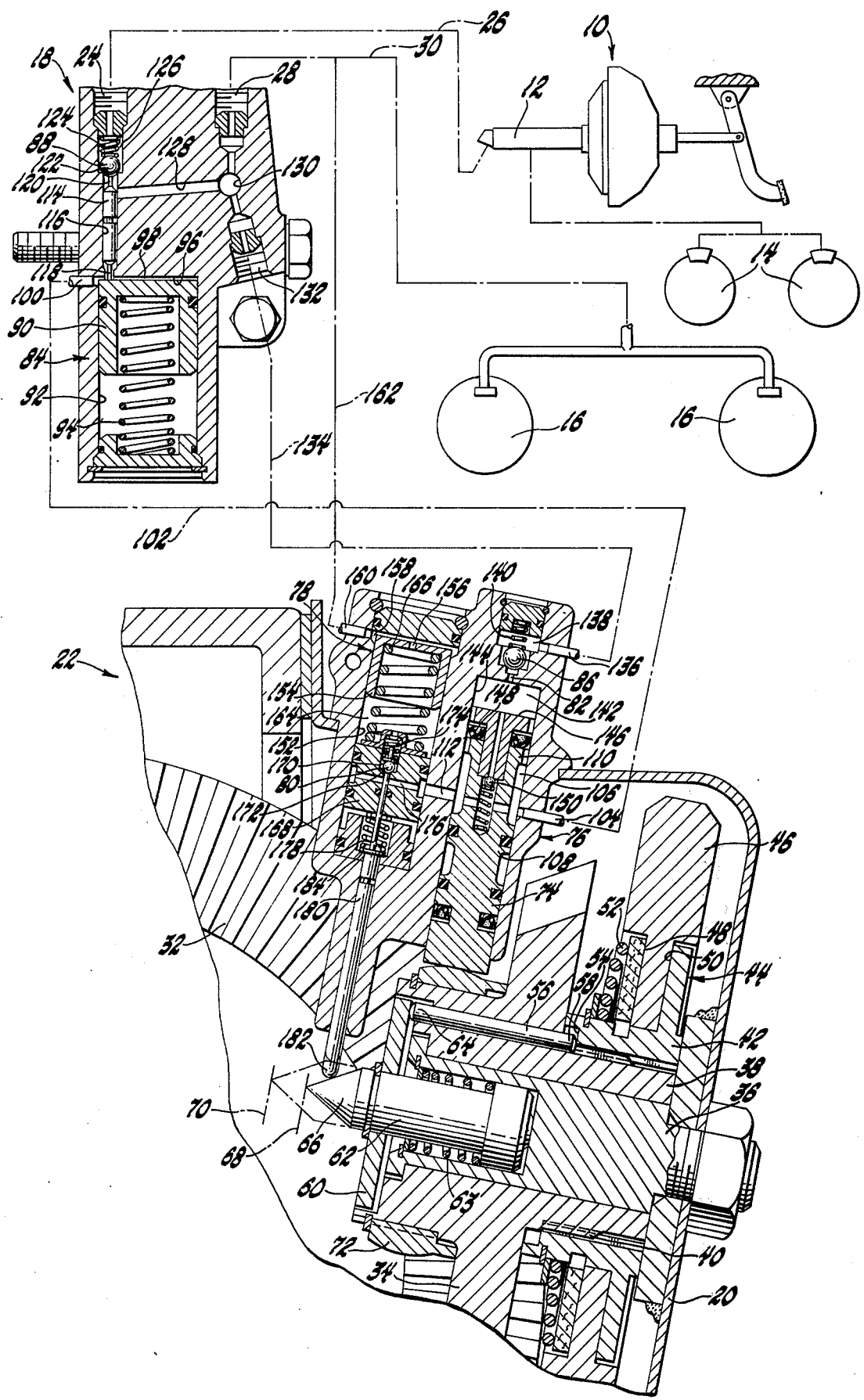

MECHANICAL WHEEL LOCK CONTROL

The invention relates to a wheel lock control system which is mechanically operated and controlled. The system is self-contained in the rear wheel differential housing and only requires hydraulic connections from the master cylinder and to the rear wheel brakes. The system has a drive mechanism responsive to wheel deceleration and acceleration. The drive mechanism is preferably driven from the differential ring gear through a drive gear to a shaft. The shaft drives a flywheel through a clutch mechanism, the flywheel sensing the deceleration and acceleration rates of the rear wheels through the differential gears. The clutch reduces impact forces on the flywheel actuating mechanism and imparts a time element to the release valve that is responsive to vehicle speed. A rear brake fluid accumulator is provided for storing rear brake actuating fluid during each brake release cycle of the system. A pump driven by a cam on the flywheel drive shaft acts during each brake reapply cycle to pump fluid from the accumulator to the rear wheel brakes to restore the original brake actuating pressure. The system includes a valve which cuts off brake supply pressure from the master cylinder during the release and reapply cycles. It also has rate control orifices which control the rate of pressure decrease from the rear brake cylinders during each release cycle and the rate of pressure increase to the rear brake cylinders during each reapply cycle. When a release cycle is initiated a release valve is mechanically actuated by the inertia of the flywheel to release actuating pressure fluid from the rear brakes to the accumulator. The system includes appropriate conduits and passages connecting the various hydraulic components.

IN THE DRAWING:

The single FIGURE is a schematic illustration of a system embodying the invention in a vehicle, with parts broken away and in section.

The vehicle in which the system is installed includes a brake booster and dual pressure chamber master cylinder assembly 10 with one pressurizing chamber of the master cylinder portion 12 being connected to the front wheel brakes 14 and the other master cylinder pressurizing chamber being operatively connected to the rear wheel brakes 16. The latter connection is made through the wheel lock control mechanism 18 embodying the invention. Mechanism 18 is illustrated as being mounted within and on the housing 20 of the differential assembly 22. Mechanism 18 has an inlet port 24 connected to conduit 26, which in turn is connected to the master cylinder portion 12 of assembly 10 to provide brake supply pressure to port 24 when assembly 10 is actuated. An outlet port 28 of mechanism 18 is connected to conduit 30 which transmits brake apply pressure to and from the rear wheel brakes 16.

The differential mechanism is contained in housing 20, with the differential ring gear 32 being a part of the differential assembly. As is well know, ring gear 32 will rotate at various speeds in relation to speeds of the rear wheels, and therefore the acceleration and deceleration of ring gear 32 is responsive to the changes in speed of the rear wheels. A drive gear 34 is positioned within housing 20 to be rotatably driven by ring gear 32. The drive gear 34 is positioned to rotate on a stub shaft 36 which is fastened to a portion of the housing 20. Drive gear 34 has a hub defining a hollow shaft 38 extending from either side of the gear 34. One end of shaft 38 is provided with external splines 40 which receive the drive member 42 of flywheel drive clutch 44. There is about a 12° circumferential arc of relative movement permitted between shaft 38 and drive member 42. Drive member 42 receives the flywheel 46 between the clutch faces 48 and 50 so that the clutch faces frictionally engage the flywheel in drive relation while permitting the flywheel to move circumferentially to a limited extent when sufficient inertia exists relative to the drive member 42 to overcome the driving engagement. Clutch face 48 is spring loaded by spring 52 to continually urge the clutch faces into frictional engagement with the flywheel. Cam surfaces 54 are provided on drive member 42 and are rotated relative to drive gear 34 to the extent permitted by the spacing of splines 40 when the flywheel overruns drive gear 34 due to deceleration of the rear wheels beyond a predetermined deceleration rate. A series of pins 56 are slidably mounted in drive gear 34 in circumferentially spaced relation and extend parallel to the axis of rotation of the drive gear. For example, three such pins may be used. The pin ends 58 cooperate with cam surfaces 54 so that the pins are moved axially in response to sufficient wheel deceleration. A cam plate 60 is mounted on a plunger 62 housed in the inner end of stub shaft 36 for axial sliding movement, and is engaged by the other ends 64 of pins 56 to be moved axially when the pins are axially moved as above described. A generally cone-shaped release cam 66 is provided on one end of plunger 62 and located on the outer side of cam plate 60. A spring 63 acts to continually urge the cam plate 60 and cam 66 rightwardly against pins 56, also preloading the drive member against its arcuate movement relative to shaft 38 until a predetermined deceleration rate is achieved by the rear wheels. The cam 66 normally occupies a first position 68 when the flywheel 46 is being driven concurrently with drive gear 34, and is moved to a second position 70 upon sufficient wheel deceleration causing axial movement of pins 56 as above described. The shaft 38 of drive gear 34 has a pump drive 72 on its end opposite splines 40. The pump drive is an eccentric ring which rotates with drive gear 34. The piston 74 of pump 76 is in camming engagement with pump drive 72 so that the piston is reciprocated as the drive rotates.

Mechanism 18 generally includes the pump 76; a restrictive orifice-surge dashpot 78; a release valve 80, including mechanism for opening and closing the valve; a brake pressure reapply rate control orifice 82; an accumulator 84; a brake apply pressure check valve 86; and brake supply pressure check valve 88, with mechanism responsive to the accumulator 84 to open and permit closure of the valve.

The accumulator 84 has a piston 90 reciprocably received in cylinder 92 and urged by spring 94 toward cylinder end 96. The head of piston 90 and cylinder end 96 define the accumulator chamber 98. The chamber has a port 100 connected by conduit 102 to port 104 of pump 76. Port 104 opens into an annular chamber 106 between a pair of pump piston lands 108 and 110. A passage 112 also opens into chamber 106. Port 104 and passage 112 are always in communication with chamber 106 regardless of the action of pump piston 74.

A pin 114 is reciprocably mounted in a passage 116 so that one pin end 118 engages the head of accumulator piston 90 and the other pin end 120 is positioned to engage check valve 88 and, when the head of piston 90 is adjacent cylinder end 96, to lift the check valve 88 off of its valve seat 122 formed by one end of passage 116. Valve spring 124 urges check valve 88 toward its seat 122. The valve chamber 126 containing valve 88 and spring 124 is in fluid communication with inlet port 24 and therefore is at the brake supply pressure from master cylinder 12. Pin end 120 is fluted so that when valve 88 is open fluid may pass from chamber 126 into a portion of passage 116. A cross passage 128 communicates with passage 116 and is so positioned relative to the fluted end 120 of pin 114 that fluid is communicated with passage 128 from chamber 126 when valve 88 is open. A passage 130 is in fluid communication with passage 128 and also with outlet port 28. Therefore, when check valve 88 is open, brake supply pressure from master cylinder 12 passes through mechanism 18 via inlet port 24; passages 116, 128 and 130; outlet port 28 and conduit 30. It becomes brake apply pressure delivered to the rear wheel brakes 16. Brake apply pressure is also delivered from passage 130 through outlet 132 and conduit 134 to port 136. The valve chamber 138 containing check valve 86 communicates with port 136 and containes the check valve 86 and its spring 140. The valve 86 is urged by its spring to seat against and close the apply rate control orifice 82, which opens into the pump pressure chamber 142 of pump 76. Chamber 142 is formed by one end of pump cylinder 144 and end 146 of pump piston 74. Pump piston land 110 has a V-block seal 148 which during pumping movements of pump piston 74 will act as a one-way valve permitting fluid to be drawn into chamber 142 from chamber 106 past land 110 on the expansion stroke, and preventing reverse flow during the compression stroke. A pump pressure relief valve 150 is positioned in piston 74 and acts to limit the pressure build-up in chamber 142. At the pressure limit, valve 150 will be opened and the pressure released to chamber 106. Then fluid will be pumped in a circular route past seal 148 and valve 150 under this condition.

A cylinder 152 formed in the housing of mechanism 18 contains the restrictive orifice-surge dashpot 78 and the release valve 80. A piston 154 has an orifice 156 extending axially through the head thereof. Piston 154 is reciprocably mounted in one end of cylinder 152 so that its head and one end of the cylinder define a chamber 158 to which a port 160 is connected. Conduit 162 provides fluid communication between port 160 and conduit 30, therefore maintaining rear wheel brake apply pressure in chamber 158. The other side of piston 154 defines with a portion of cylinder 152 a chamber 164 in which piston spring 166 is received. This spring acts against piston 154 to urge it toward chamber 158. A valve body 168 is mounted in cylinder 152 and provides the valve chamber 170 and seat 172 for release valve 80. The release valve spring 174 urges valve 80 closed. When the valve 80 is so closed it prevents fluid from passing out of chamber 164 through the valve seat 172. A cross passage 176 in valve body 168 is in fluid communication with passage 112 and the valve seat 172 for valve 80. A valve opening pin 178 is reciprocably mounted through valve body 168 so that it can engage valve 80 and lift the valve from its seat 172 when the pin is moved upwardly as seen in the drawing. The pin 178 is actuated by a push rod 180 which has a cam follower end 182 engaging release cam 66. Spring 184 urges push rod 180 toward cam 66 and therefore in a direction tending to permit valve 80 to be closed. It can be seen that when cam 66 moves from its first position 68 to its second position 70 it will move push rod 180 upwardly, moving pin 178 upwardly and opening valve 80. This will connect chamber 164 with port 104 through passage 176, passage 112, and chamber 106.

In normal vehicle brake operation, the master cylinder 12 is actuated to pressurize brake fluid in the front wheel brakes 14 and conduit 26. Since check valve 88 is held open by pin 114 and piston 90 of accumulator 84, the pressurized fluid in conduit 26 passes through inlet port 24, past check valve 88, and then through the upper portion of passage 116 to passages 128 and 130. It is delivered to the rear wheel brakes 16 through conduit 30. It also passes through conduit 134 to port 136 and into chamber 138. Check valve 86 is closed at this time. The pressurized fluid also passes through conduit 162 to port 160 and into chamber 158. It goes through orifice 156 and into chamber 164. Since check valve 80 is also closed, the pressure remains on one side of that valve. So long as no incipient wheel lock occurs at the rear wheels, flywheel 46 will rotate concurrently with shaft 38 as driven by drive gear 34. The cam surfaces 54 will not be moved and pins 56 will remain in the position shown in the drawing. Therefore release cam 66 will remain in its first position 68, permitting pins 178 and 180 to be in their downward position to permit check valve 80 to stay closed.

When the rear wheels decelerate at a sufficient rate, flywheel 46 tends to overrun shaft 38. This is permitted due to the approximately 12° circumferential spacing of the splines 40 relative to the splines of member 42. This movement occurs when the tendency of the flywheel 46 to overrun generates sufficient force to cam pins 56 leftwardly against the force exerted by the spring 63 as it acts on plunger 62 and cam plate 60. The axial movement of pins 56 causes release cam 66 to be moved from its first position 68 to its second position 70. This cams pin 180 upwardly against the force of spring 184, causing pin 178 to open valve 80. The brake apply pressure in chamber 164 then moves through the valve seat 172 to passage 176. Therefore brake apply pressure from the rear brakes 16 moves through release rate control orifice 156. The pressure passes through passage 112, chamber 106, port 104, conduit 102, and port 100, pressurizing accumulator chamber 98 and transferring its volume of fluid into that chamber. Since spring 94 is a light spring, this is accomplished with little accumulator pressure resistance. Piston 154 acts as a surge piston once this flow begins to occur, and any flow that orifice 156 does not immediately permit will cause piston 154 to move downwardly against the force of its spring 166, temporarily increasing the volume of chamber 158. Piston 154 will then move upwardly as soon as the flow can be taken care of through orifice 156. It can be seen that the brake apply pressure is therefore released to the accumulator chamber at a controlled rate. The result is a decrease in rear wheel brake actuation, giving the rear wheels an opportunity to accelerate until they are no longer in an incipient wheel lock condition. As the accumulator piston 90 moves downwardly, pin 114 is moved downwardly by valve spring 124 until valve 88 seats on valve seat 122. This immediately cuts off brake supply pressure from the master cylinder 12, thereby preventing this pressure from tending to keep the rear wheel brakes 16 pressurized during the release cycle.

The reapply cycle is initiated when the rear wheels begin to accelerate so that an incipient wheel lock condition no longer exists. Spring 63 forces pins 56 rightwardly, camming clutch drive member 42 back to the normal drive position. The flywheel 46 follows the clutch drive member, and is assisted by its tendency to resist acceleration. This action returns release cam 66 to its first position 68. Push rod 180 moves downwardly under the force of spring 184, and pin 178 follows due to the urging of valve spring 174. Release valve 80 is therefore closed. Meanwhile, pump 76 is pumping fluid from the accumulator chamber 98 by way of port 100, conduit 102, port 104, chamber 106, and seal 148. The pump pressure in pump chamber 142 passes through apply rate control orifice 82 and opens check valve 86. The pressure therefore is delivered at a rate controlled by orifice 82 to the rear wheel brakes 16 through port 136, conduit 134, passage 130, and conduit 30. When the accumulator piston 90 is moved upwardly to the position shown as chamber 98 is emptied, it moves pin 114 upwardly to reopen check valve 88. The brake supply pressure at port 24 can therefore again pass by check valve 88 and be delivered to the rear wheel brakes 16 as brake apply pressure. The normal brake apply condition is therefore reestablished.

The system will continue to cycle in this manner so long as incipient wheel lock conditions reoccur while the brake system is actuated.

What is claimed is:

1. A wheel lock control system in a vehicle having wheel means to be braked and a source of brake actuating pressure, said system comprising:

drive mechanism responsive to wheel deceleration and acceleration and including first control means actuatable from a first position to a second position while wheel deceleration is greater than a predetermined value and actuatable to said first position when wheel deceleration is less than a predetermined value, and pump drive means driven in accordance with wheel speed;

a fluid pump driven by said pump drive means and having a fluid input and a fluid output;

first conduit means connecting said source of controlled brake actuating pressure with wheel brake means for said wheel means and having therein a first check valve spring biased closed to prevent pressure from being delivered from said source;

first valve opening means normally holding said first check valve open;

a fluid pressure accumulator having a pressure movable spring biased wall therein having an uncharged position and movable by fluid pressure to a charged position, said wall being operatively connected to said first valve opening means to allow movement thereof as said wall moves toward the charged position to permit said first check valve means to close, and upon return of said wall to said uncharged position moving said first valve opening means to open said first check valve;

a normally closed second check valve and a first restrictive orifice in fluid series and connecting said pump output with said first conduit means intermediate said first check valve and said wheel brake means, said second check valve permitting fluid flow only from said pump to said first conduit means;

second conduit means fluid connecting said pump input with said first conduit means intermediate said first check valve and said wheel brake means;

a restrictive orifice — surge dashpot permitting fluid flow therethrough and a third check valve in series therewith said orifice — dashpot and third check valve being in said second conduit means, said third check valve being biased closed to prevent fluid flow from said first conduit means and said orifice — dashpot to said pump input.

* * * * *

UNITED STATES PATENT AND TRADEMARK OFFICE
CERTIFICATE OF CORRECTION

PATENT NO. : 4,046,427
DATED : September 6, 1977
INVENTOR(S) : Gene P. Baynes
Frank W. Brooks It is certified that error appears in the above-identified patent and that said Letters Patent are hereby corrected as shown below:

Column 3, line 18, "pessure" should be -- pressure --

Column 3, line 22, "containes" should be -- contains --.

Column 6, line 36, the period "." should be a semicolon -- ; -- and add the following beginning at the next line -- and another valve opening means responsive to actuation of said first control means to said second position to open said third check valve and hold it open only while said first control means is in said second position. --

Signed and Sealed this

Twenty-seventh Day of December 1977

[SEAL]

Attest:

RUTH C. MASON
Attesting Officer

LUTRELLE F. PARKER
Acting Commissioner of Patents and Trademark